(12) United States Patent
Drymiller

(10) Patent No.: US 11,984,041 B1
(45) Date of Patent: May 14, 2024

(54) SYSTEM AND METHOD FOR TEACHING ARITHMETIC

(71) Applicant: David Drymiller, Bartlett, IL (US)

(72) Inventor: David Drymiller, Bartlett, IL (US)

( * ) Notice: Subject to any disclaimer, the term of this patent is extended or adjusted under 35 U.S.C. 154(b) by 934 days.

(21) Appl. No.: 17/000,838

(22) Filed: Aug. 24, 2020

(51) Int. Cl.
*G09B 19/02* (2006.01)
*G09B 23/02* (2006.01)

(52) U.S. Cl.
CPC ............ *G09B 19/02* (2013.01); *G09B 23/02* (2013.01)

(58) Field of Classification Search
None
See application file for complete search history.

(56) References Cited

U.S. PATENT DOCUMENTS

| | | | |
|---|---|---|---|
| 4,092,029 A | 5/1978 | Jones | |
| 5,273,430 A | 12/1993 | Strychewski | |
| 5,679,002 A | 10/1997 | Scelzo | |
| 5,688,126 A * | 11/1997 | Merritt | A63F 3/0415 434/128 |
| 5,782,471 A | 7/1998 | Bautista et al. | |
| 5,918,882 A | 7/1999 | Truong | |
| 5,927,717 A | 7/1999 | Berkovi et al. | |
| 6,089,871 A | 7/2000 | Jaffe | |
| 6,116,603 A * | 9/2000 | Huang | A63F 3/0415 273/272 |
| 6,648,648 B1 | 11/2003 | O'connell | |
| 7,077,654 B2 | 7/2006 | Burtness | |
| 8,128,407 B2 | 3/2012 | Brett | |
| 8,708,703 B2 | 4/2014 | Fluster | |
| 10,325,516 B1 | 6/2019 | Drymiller | |
| 2002/0015936 A1* | 2/2002 | Donn | G09B 19/02 434/209 |
| 2011/0275038 A1 | 11/2011 | Penner | |
| 2013/0026710 A1 | 1/2013 | Sambriski | |

FOREIGN PATENT DOCUMENTS

GB 2393132 B 4/2006
WO 2008063044 A1 5/2008

* cited by examiner

*Primary Examiner* — James B Hull
(74) *Attorney, Agent, or Firm* — Paul J. Nykaza

(57) ABSTRACT

A system and method for teaching arithmetic has a plurality of training aides or manipulatives wherein a child/student learns arithmetic facts by executing the method using the system. The physical training aids may include a die (10,12), a factor card (14) and a factor finder member (16). The physical training aids are used with the child where the child creates a multiplication product by rolls of the die (10,12) wherein the child uses the factor card (14) and the factor finder member (16) to identify factor numbers associated with the multiplication product. A game may be incorporated where the child can use the system and method in playing the game.

25 Claims, 10 Drawing Sheets

FIG. 4

| 8 | 16 | 24 | 32 | 40 | 48 | 56 |
| 7 | 14 | 21 | 28 | 35 | 42 | 49 |
| 6 | 12 | 18 | 24 | 30 | 36 | 42 |
| 5 | 10 | 15 | 20 | 25 | 30 | 35 |
| 4 | 8 | 12 | 16 | 20 | 24 | 28 |
| 3 | 6 | 9 | 12 | 15 | 18 | 21 |
| X | 2 | 3 | 4 | 5 | 6 | 7 |

FIG. 5

| 9 | 9 | 81 | 36 | 54 | 45 | 18 |
| 3 | 3 | 27 | 12 | 18 | 15 | 6 |
| 2 | 2 | 18 | 8 | 12 | 10 | 4 |
| 7 | 7 | 63 | 28 | 42 | 35 | 14 |
| 8 | 8 | 72 | 32 | 48 | 40 | 16 |
| 4 | 4 | 36 | 16 | 24 | 20 | 8 |
| X | 1 | 9 | 4 | 6 | 5 | 2 |

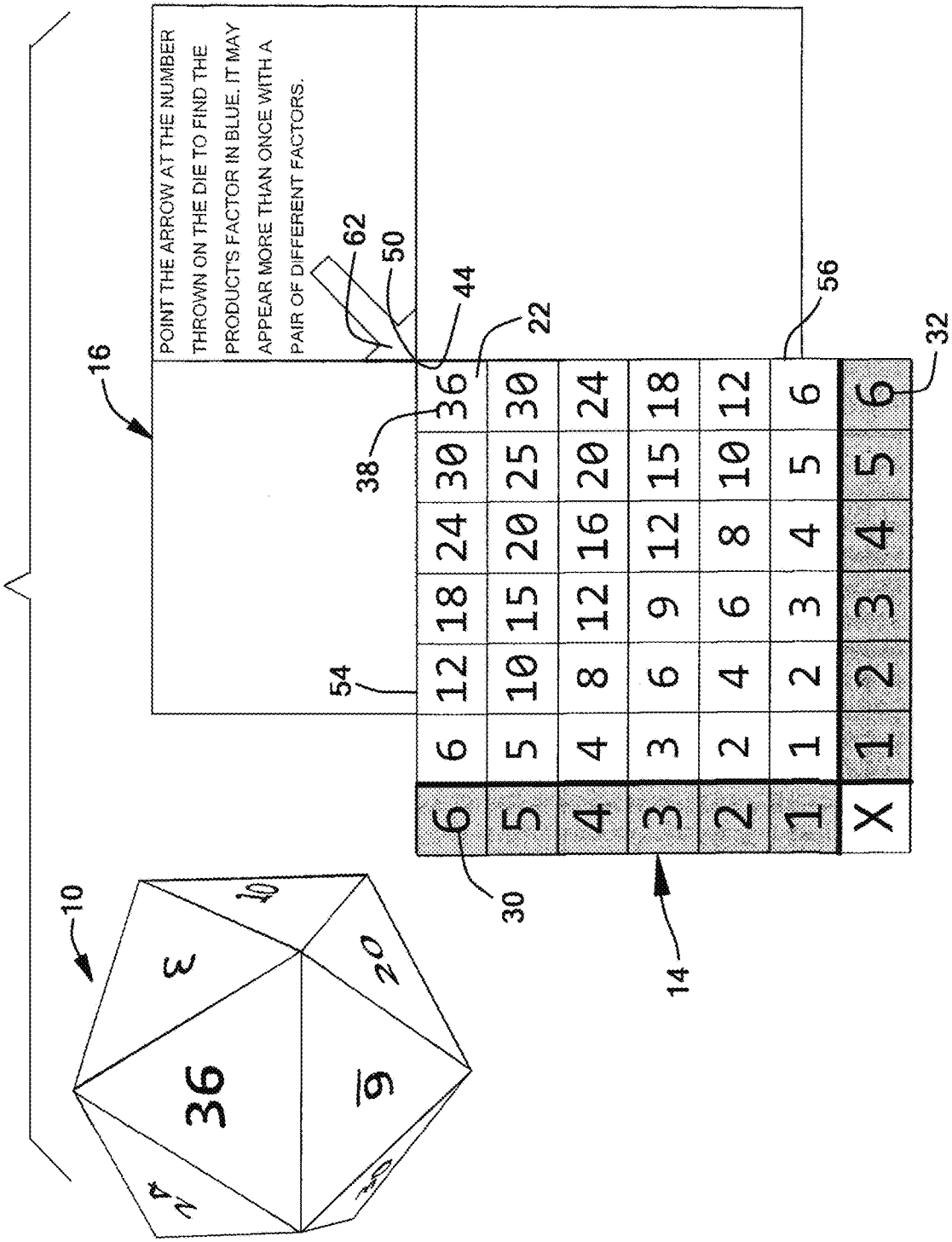

SYSTEM AND METHOD FOR TEACHING ARITHMETIC

CROSS-REFERENCE TO RELATED APPLICATIONS

None.

FEDERALLY SPONSORED RESEARCH OR DEVELOPMENT

None.

TECHNICAL FIELD

The invention relates generally to a system and method for teaching arithmetic, namely multiplication and, in particular, to physical training aids used in a method that allows a child to learn multiplication more efficiently and wherein the system and method can be applied in a game in further learning multiplication.

BACKGROUND OF THE INVENTION

Arithmetic is a basic skill that is very important for children to master. It is important because becoming skillful in arithmetic and mathematics allows one to do other things correctly. Becoming skillful in basic arithmetic such as addition and subtraction is needed before proceeding to other mathematical techniques such as multiplication and division and even further advanced mathematical operations such as algebra, trigonometry, geometry and calculus. General arithmetic such as addition and subtraction tends to be difficult for children to learn. Multiplication can also be difficult for children to learn. Multiplication has further complexity compared to addition and subtraction. The attention span of many children is short, and children often do not consider learning arithmetic to be fun. Furthermore, typical arithmetic teaching methods focus on straight memorization. Thus, children can often become easily distracted and disengaged. Even many currently-available arithmetic-related games focus on memorization. Thus, the children focus on memorization and do not really understand what they are learning. Also, when children do not learn arithmetic quickly, they tend to automatically conclude that they do not like math. This perpetuates the difficulties of learning arithmetic. Other prior art methods require children to count and mark up a number line in order to perform addition and subtraction problems. This often leads to children experiencing difficulties as the children inadvertently lose track of proper locations on the number line while counting and marking along the number line. Children's eye movements at this age level are lacking which leads to mistakes in using the number line. A more innovative method using unique physical training aids, or manipulatives that children can relate to will allow children to learn basic arithmetic, including multiplication, quicker and more efficiently.

While such arithmetic methods, systems and games according to the prior art provide a number of advantageous features, they nevertheless have certain limitations. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a system and method for teaching arithmetic, namely multiplication, that can also be used in a playing a game. By executing the system and method as well as playing the game, a child/student/player learns arithmetic multiplication facts. By using the system and method correctly, the child/player does not provide a wrong answer as the system and method minimizes the chance for a wrong answer.

According to a first aspect of the invention, the system and method for teaching arithmetic includes a plurality of physical training aides. The physical training aids, or manipulatives, may include, but not be limited to, a die or dice, a factor card and a factor finder member. The physical training aids are used with the child where the child creates a multiplication product by rolls of the die wherein the child uses the factor card and the factor finder member to identify factor numbers associated with the multiplication product.

According to another aspect of the invention, a method for teaching arithmetic to a student is disclosed. The method includes the step of providing a first 20-sided die, respective sides of the die are numbered with a number, each number corresponding to a multiplication product from two factors, one factor being selected from a plurality of first factors and the other factor being selected from a plurality of second factors. The method also includes the step of providing a factor card having a first side having a plurality of spaces. The first side of the factor card has a first column of spaces numbered with the plurality of first factors, and the first side of the factor card has a first row of spaces numbered with the plurality of second factors. The spaces positioned at intersecting lines extending from the numbers of the first column and extending from the numbers of the first row have a product number therein corresponding to the multiplication product of the respective numbers of the first column and the first row. The method further includes the step of providing a factor finder member having a first member cooperating with a second member to define a corner, the first member defining a first inner edge and the second member defining a second inner edge. The method includes the further steps of rolling the first die to show a first numerical value, placing the corner of the factor finder member at the product number on the factor card corresponding to the first numerical value, identifying a first factor corresponding to the number on the first column adjacent the first inner edge, and identifying a second factor corresponding to the number on the first row adjacent the second inner edge.

According to a further aspect of the invention, the plurality of first factors are the numbers 1, 2, 3, 4, 5 and 6 and the plurality of second factors are the numbers 1, 2, 3, 4, 5 and 6. The first column of spaces on the first side of the factor card are numbered consecutively with the numbers 1, 2, 3, 4, 5 and 6, and the first row of spaces on the first side of the factor card are numbered consecutively with the numbers 1, 2, 3, 4, 5 and 6.

According to a further aspect of the invention, the method includes the further step of providing a second 20-sided die, respective sides of the die numbered with a number, each number corresponding to a multiplication product from two factors, one factor being selected from a plurality of third factors and the other factor being selected from a plurality of fourth factors.

According to a further aspect of the invention, the factor card has a second side having a plurality of spaces, the second side of the factor card having a first column of spaces numbered with the plurality of third factors, the second side of the factor card having a first row of spaces numbered with the plurality of fourth factors. The spaces positioned at intersecting lines extending from the numbers of the first column on the second side of the factor card and extending from the numbers of the first row on the second side of the factor card have a second product number therein corresponding to the multiplication product of the respective numbers of the first column on the second side of the factor card and the first row on the second side of the factor card.

According to a further aspect of the invention, the plurality of third factors are the numbers 4, 5, 6, 7, 8 and 9 and the plurality of fourth factors are the numbers 4, 5, 6, 7, 8 and 9. The first column of spaces on the second side of the factor card are numbered consecutively with the numbers 4, 5, 6, 7, 8 and 9, and the first row of spaces on the second side of the factor card are numbered consecutively with the numbers 4, 5, 6, 7, 8 and 9.

According to yet another aspect of the invention, the method includes the steps of rolling the second die to show a second numerical value, placing the corner of the factor finder member at a second product number on the second side of the factor card corresponding to the second numerical value, the first inner edge extends to the first column and the second inner edge extends to the first row, identifying a third factor corresponding to the number on the first column on the second side of the factor card adjacent the first inner edge, and identifying a fourth factor corresponding to the number on the first row on the second side of the factor card adjacent the second inner edge.

According to yet another aspect of the invention, the first column and the first row on the first side of the factor card have a shaded background, and the first column and the first row on the second side of the factor card have a shaded background.

According to a further aspect of the invention, the first member and the second member of the factor finder member intersect at a right angle wherein the corner is defined as an inner corner, and wherein the factor finder member has an arrow having an apex positioned at the inner corner.

According to another aspect of the invention, a system for teaching arithmetic to a student is provided. The system has a first 20-sided die, respective sides of the die numbered with a number, each number corresponding to a multiplication product from two factors, one factor being selected from a plurality of first factors and the other factor being selected from a plurality of second factors. The system further has a factor card having a first side having a plurality of spaces, the first side of the factor card having a first column of spaces numbered with the plurality of first factors, the first side of the factor card having a first row of spaces numbered with the plurality of second factors, wherein spaces positioned at intersecting lines extending from the numbers of the first column and extending from the numbers of the first row have a product number therein corresponding to the multiplication product of the respective numbers of the first column and the first row. The system also has a factor finder member having a first member cooperating with a second member to define a corner, the first member defining a first inner edge and the second member defining a second inner edge. In the system the student rolls the first die to show a first numerical value, and wherein the student places the corner of the factor finder member at a product number on the factor card corresponding to the first numerical value, and wherein the first inner edge extends to the first column and the second inner edge extends to the first row, wherein the student identifies a first factor corresponding to the number on the first column adjacent the first inner edge, and wherein the student identifies a second factor corresponding to the number on the first row adjacent the second inner edge.

According to another aspect of the invention, the plurality of first factors are the numbers 1, 2, 3, 4, 5 and 6 and the plurality of second factors are the numbers 1, 2, 3, 4, 5 and 6. The first column of spaces on the first side of the factor card are numbered consecutively with the numbers 1, 2, 3, 4, 5 and 6, and the first row of spaces on the first side of the factor card are numbered consecutively with the numbers 1, 2, 3, 4, 5 and 6.

According to another aspect of the invention, the system further comprises a second 20-sided die, respective sides of the die numbered with a number, each number corresponding to a multiplication product from two factors, one factor being selected from a plurality of third factors and the other factor being selected from a plurality of fourth factors.

According to a further aspect of the invention, the factor card has a second side having a plurality of spaces, the second side of the factor card having a first column of spaces numbered with the plurality of third factors, the second side of the factor card having a first row of spaces numbered with the plurality of fourth factors. The spaces positioned at intersecting lines extending from the numbers of the first column on the second side of the factor card and extending from the numbers of the first row on the second side of the factor card have a second product number therein corresponding to the multiplication product of the respective numbers of the first column on the second side of the factor card and the first row on the second side of the factor card. In addition, the plurality of third factors are the numbers 4, 5, 6, 7, 8 and 9 and the plurality of fourth factors are the numbers 4, 5, 6, 7, 8 and 9. The first column of spaces on the second side of the factor card are numbered consecutively with the numbers 4, 5, 6, 7, 8 and 9, and the first row of spaces on the second side of the factor card are numbered consecutively with the numbers 4, 5, 6, 7, 8 and 9.

According to a further aspect of the invention, in the system, the student rolls the second die to show a second numerical value, and wherein the student places the corner of the factor finder member at a second product number on the second side of the factor card corresponding to the second numerical value, the first inner edge extends to the first column and the second inner edge extends to the first row, wherein the student identifies a third factor corresponding to the number on the first column on the second side of the factor card adjacent the first inner edge, and wherein the student identifies a fourth factor corresponding to the number on the first row on the second side of the factor card adjacent the second inner edge.

According to a further aspect of the invention, the first column and the first row on the first side of the factor card have a shaded background, and the first column and the first row on the second side of the factor card have a shaded background.

According to a further aspect of the invention, the plurality of first factors are the numbers 1, 2, 3, 4, 5 and 6, and the plurality of second factors are the numbers 1, 2, 3, 4, 5 and 6. The plurality of third factors are the numbers 4, 5, 6, 7, 8 and 9, and the plurality of fourth factors are the numbers 4, 5, 6, 7, 8 and 9.

According to yet another aspect of the invention, the first member and the second member of the factor finder member intersect at a right angle wherein the corner is an inner corner. In an exemplary embodiment, the factor finder member has an arrow having an apex positioned at the inner corner. In addition, the factor finder member defines a first area adjacent the inner corner, the first area having instruction for the student for properly placing the factor finder member with the factor card.

According to a further aspect of the invention, the system further comprises a game board and game pieces, the game board having a plurality of spaces having a respective factor number in each space. The student, in response to identifying a first factor and a second factor, places a game piece on the game board in a space having a factor number corresponding to the first factor and the second factor.

According to a further aspect of the invention, the training aids can be applied in a game for children to play. In playing the game, children apply the system and method of the present invention and become more proficient in arithmetic, namely multiplication.

According to a further aspect of the invention, a mathematical game for a plurality of players is disclosed. The game has a game board showing a river and defining a plurality of land masses and further showing a plurality of bridges extending between the land masses, the bridges having a plurality of openings having a respective number in each opening. The game further includes a plurality of building members. The game includes a first 20-sided die, respective sides of the die numbered with a number, each number corresponding to a multiplication product from any two numbers selected from the numbers 1 through 6. A factor card has a first side having a first plurality of spaces, the first side of the factor card having a first column of spaces numbered consecutively from 1 to 6, the first column having a shaded background, the first side of the factor card having a first row of spaces numbered consecutively from 1 to 6, the first row having the shaded background, wherein spaces positioned at intersecting lines extending from the numbers of the first column and extending from the numbers of the first row have a product number therein corresponding to the multiplication product of the respective numbers of the first column and the first row. A factor finder member has a first member cooperating with a second member to define an inner corner, the first member defining a first inner edge and the second member defining a second inner edge. The factor finder member has an arrow having an apex positioned at the inner corner. Each player takes turns rolling the first die to show a first numerical value, and wherein the player places the inner corner of the factor finder member at a product number on the factor card corresponding to the first numerical value, wherein the apex of the arrow points to the product number and the first inner edge extends to the first column and the second inner edge extends to the first row, wherein the player identifies a first factor corresponding to the number on the first column adjacent the first inner edge, and wherein the player identifies a second factor corresponding to the number on the first row adjacent the second inner edge. Each player, in response to identifying first factors and a second factors from rolls of the die, places a building member on the respective opening of the bridge having a number corresponding to one of the first factor and the second factor.

According to a further aspect of the invention, in response to all of the openings on a bridge receiving the building block, the player is considered as crossing the bridge, wherein the first player to cross each one of the plurality of bridges is declared the winner According to a further aspect of the invention, an educational game for a plurality of players is disclosed. The game has a game board having a plurality of spaces dimensioned to receive a game piece. A first manipulative has a plurality of first pieces of information operably associated therewith, wherein the first manipulative is capable of displaying one of the first pieces of information in response to use by a player. A second manipulative has a plurality of second pieces of information operably associated therewith, wherein the second manipulative is capable of displaying one or more second pieces of information in response to use by the player wherein the player determines one or more second pieces of information that are related to the displayed first piece of information. The game includes a plurality of game pieces, wherein one or more game pieces are earned by the player based on the determined second pieces of information, wherein the player places the one or more game pieces in the respective plurality of spaces on the game board.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4 is a plan view of a side of an alternative embodiment of the factor card used in an exemplary embodiment of the present invention;

FIG. 5 is a plan view of a side of another alternative embodiment of the factor card used in an exemplary embodiment of the present invention;

FIG. 6 is a plan view of a factor finder member used in an exemplary embodiment of the present invention;

FIG. 9 is a schematic view of a die in combination with the first side of the factor card and the factor finder member;

DETAILED DESCRIPTION OF THE PREFERRED EMBODIMENT

Figure 1:
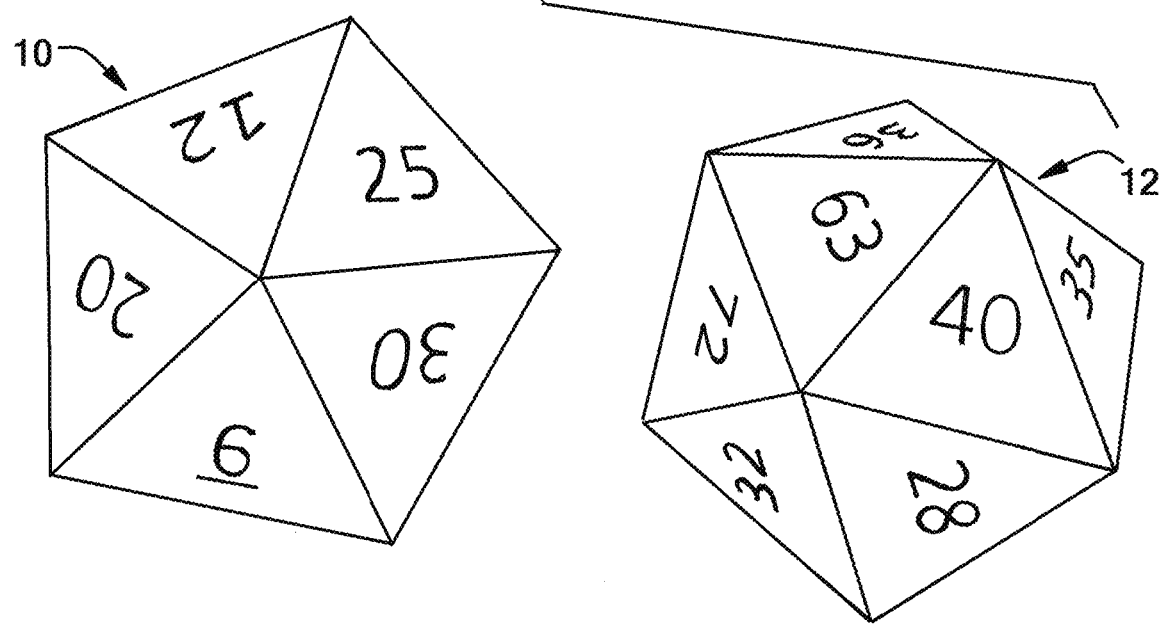
FIG. 1 is a perspective view of a plurality of training aids in the form of a pair of dice used in an exemplary embodiment of the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to the drawings, FIGS. 1-5 disclose a plurality of various physical training aids, or manipulatives, used in the system and method for teaching arithmetic according to an exemplary embodiment of the present invention. As further described below, the system and method can be applied to games children can play to further aid in the learning of arithmetic. The method can be used with a child in range of 4 to 7 years of age. It is further understood that the child needs to be able to generally count and recognize numbers in printed form.

Figure 11:
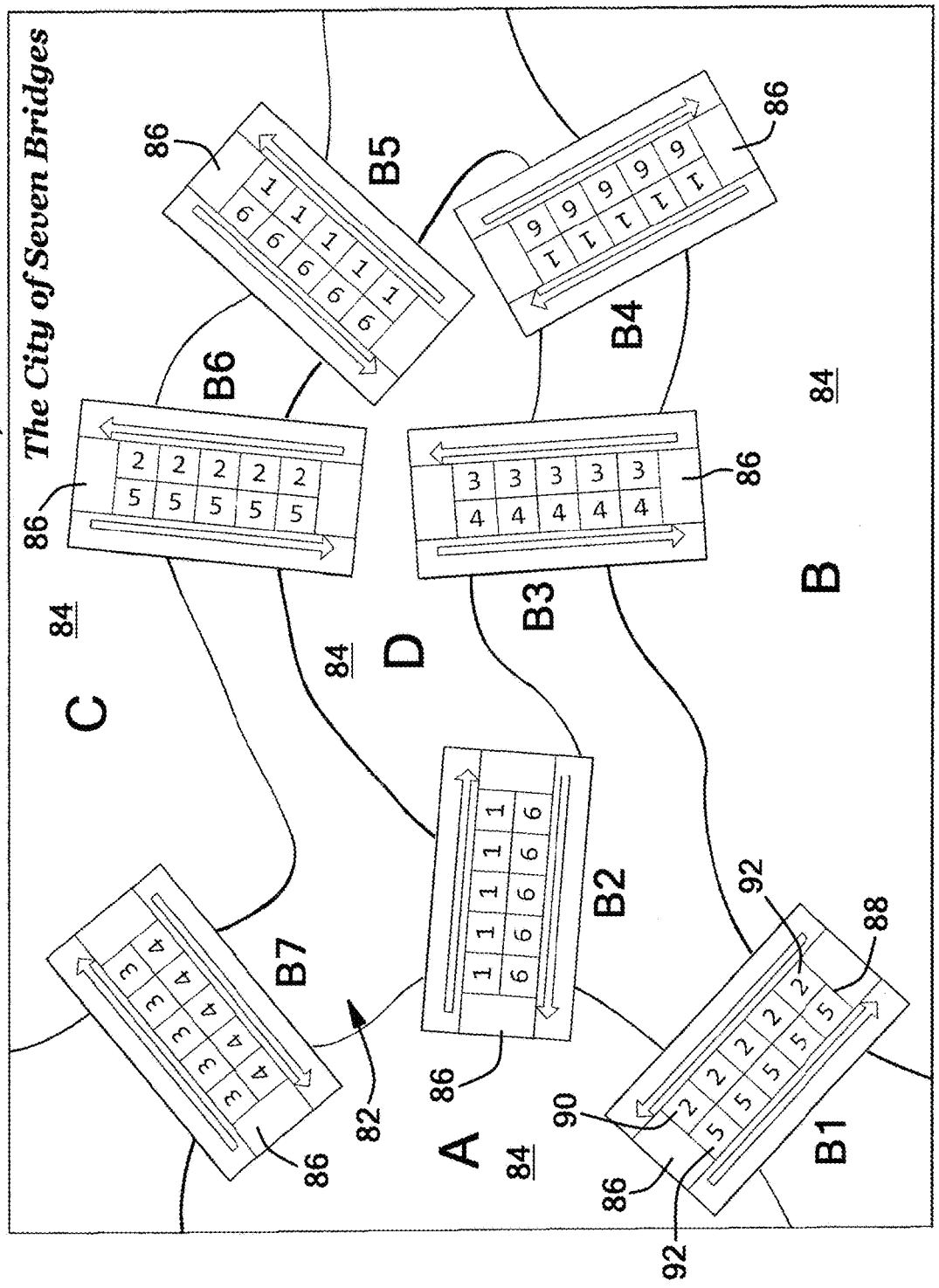
FIG. 11 is a plan view of a game board used in an exemplary embodiment of the present invention.
Figure 12:
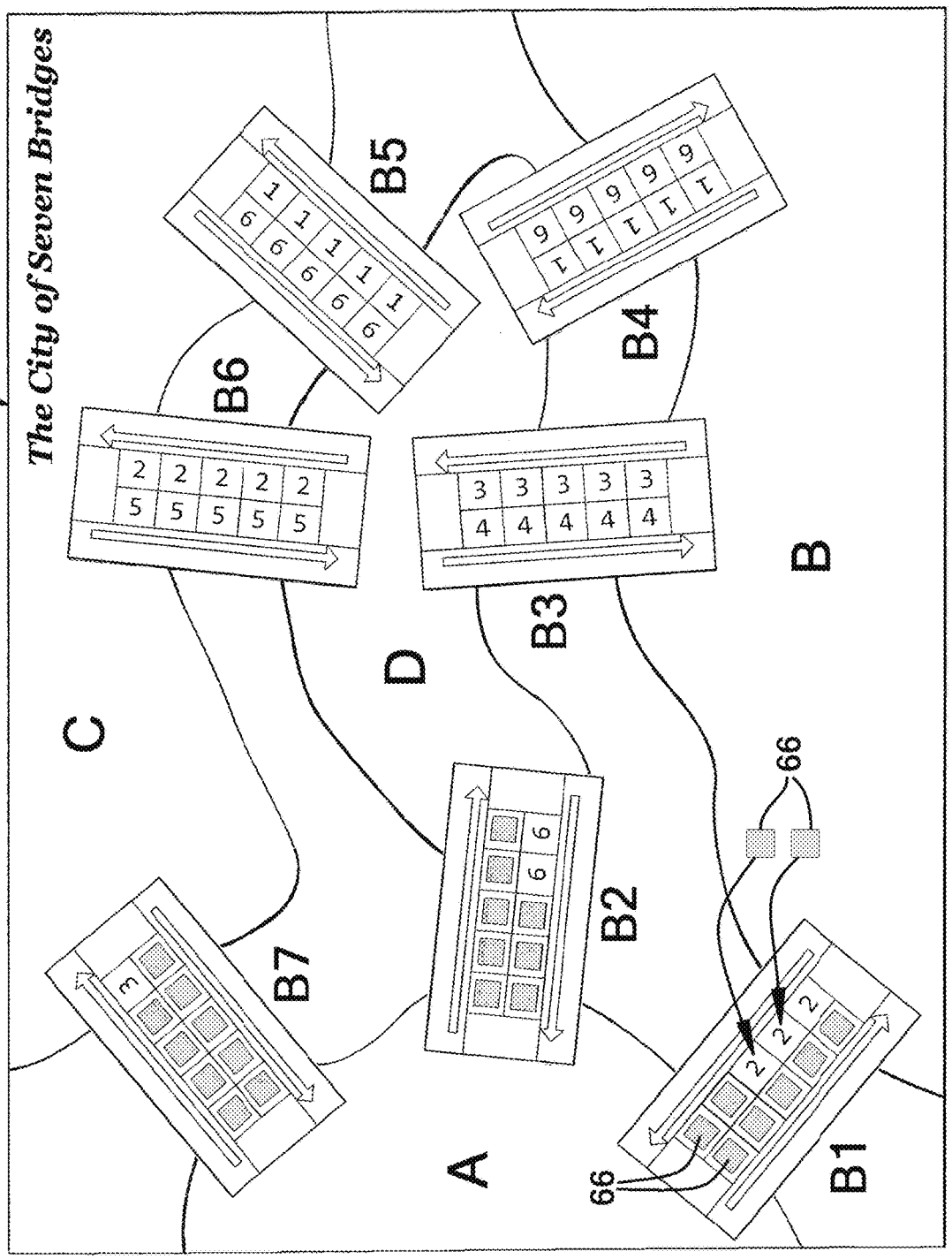
FIG. 12 is another plan view of the game board of FIG. 11 and showing a partial game play sequence.
Figure 13:
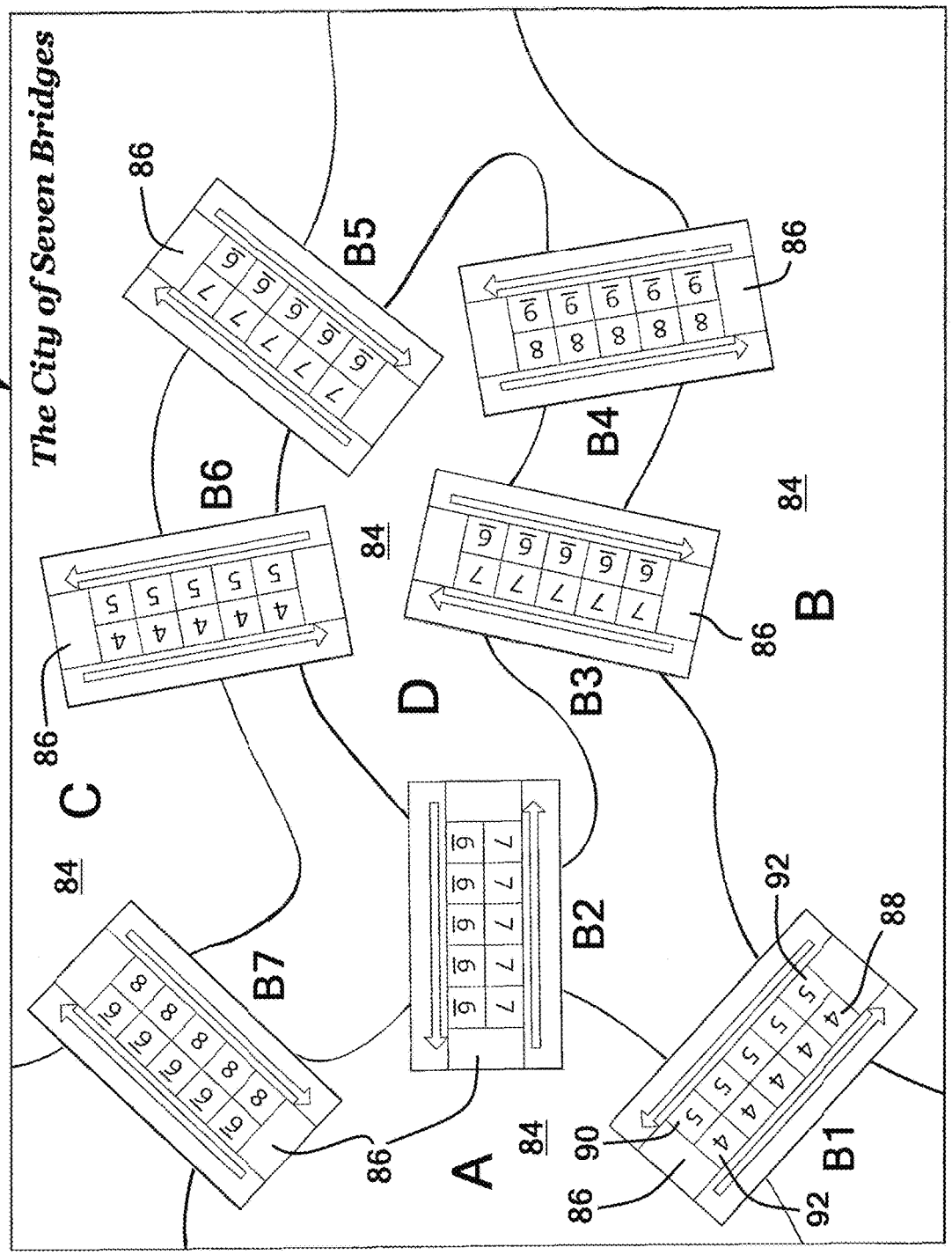
FIG. 13 is a plan view of another game board used in an exemplary embodiment of the present invention.

As further shown in FIG. 1-5, the system and method generally includes a plurality of physical aids, or manipulatives, in the form of a pair of 20-sided die pieces (FIG. 1), a first side of a factor card (FIG. 2), a second side of a factor card (FIG. 3), and a factor finder member (FIG. 6). The system and method may be used in playing games that may use a plurality of building members and game player pieces (FIG. 7) as well as a game board (FIGS. 11-13). The manipulatives may be designed and dimensioned to be capable of being hand-held by the children/students learning arithmetic. Thus, the system and method generally utilizes a die 10 or pair of dice 10, 12, a factor card 14 and a factor finder member 16. The structure of the various manipulatives will first be described followed by examples of multiplication learning as well as incorporating game-playing as part of the learning.

The system and method of the present invention uses a physical aid in the form of a random number generator such as a die or dice. FIG. 1 shows a pair of dice. A first die is generally designated with the reference numeral 10. As further shown, the first die 10 is configured to have 20 sides and further may be considered an icosahedron-shaped or polyhedron with 20 faces. The sides are connected to respective adjacent sides at particular angles to form a three-dimensional configuration. The three-dimensional configuration has a plurality of apexes formed by adjacent sides of the die 10 converging to form a respective apex. Each side is generally triangularly-shaped, and each side has a different number or numeral thereon, generally representing a multiplication product. The multiplication product numbers are associated with factor numbers, namely a factor being selected from a plurality of first factors and another factor being selected from a plurality of second factors. This association will be described in greater detail below. In one exemplary embodiment, one of the respective twenty sides of the die 10 are demarcated with one of the numerals 1, 2, 3, 4, 5, 6, 8, 9, 10, 12, 15, 16, 18, 20, 24, 25, 30 and 36. These numerals are multiplication product numbers associated with multiplication factors for the numerals 1 through 6 as will be described in greater detail below. Also, in this exemplary embodiment, two of the twenty sides are demarcated with the numerals 25 and 36. Other numerals can be duplicated that are different from 25 and 36 if desired. Different indicia configurations on the die 10 are also possible.

FIG. 1 also shows a second die generally designated with the reference numeral 12. The second die 12 is generally identical in shape to the first die 10 and may also be considered icosahedron-shaped. If desired, the second die 12 could be sized differently from the first die 10, but in an exemplary embodiment, the second die 12 is generally the same size as the first die 10. As further shown, the second die 12 is configured to have 20 sides. The sides are connected to respective adjacent sides at particular angles to form a three-dimensional configuration. The three-dimensional configuration has a plurality of apexes formed by adjacent sides of the die 12 converging to form a respective apex. Each side is generally triangularly-shaped, and each side has a different numeral thereon, generally representing a multiplication product, and which may be considered a second multiplication product. Similar to the die 10, the multiplication product numbers are associated with factor numbers, namely a factor being selected from a plurality of first factors and another factor being selected from a plurality of second factors. The factors may further be different from the first and second factors and selected from a plurality of third factors and a plurality of fourth factors. This association will be described in greater detail below. In one exemplary embodiment, one of the respective twenty sides of the die 12 are demarcated with one of the numerals 16, 20, 24, 25, 28, 30, 32, 35, 36, 40, 42, 45, 48, 49, 54, 56, 63, 64, 72 and 81. These numerals are associated with multiplication factors for the numerals 4 through 9 as will be described in greater detail below. Different indicia configurations on the die 12 are also possible.

If desired, a second set of a first die 10 and a second die 12 can be used for a second child/player using the system and method of the present invention and to play the games of the invention described herein. The second set of the first die 10 and the second die 12 could have a different color to distinguish from the first set. The second set could be of a different size as well. Further die or pairs of die 10, 12 could also be used with multiple students/players.

Figure 2:
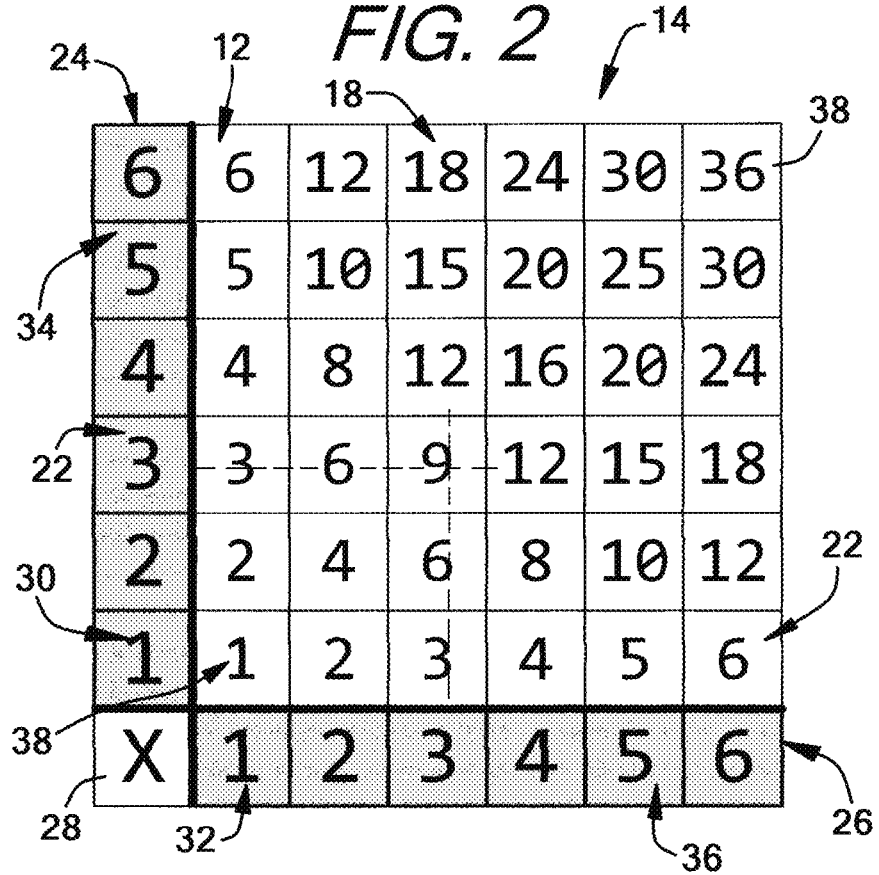
FIG. 2 is a plan view of a first side of a factor card used in an exemplary embodiment of the present invention.
Figure 3:
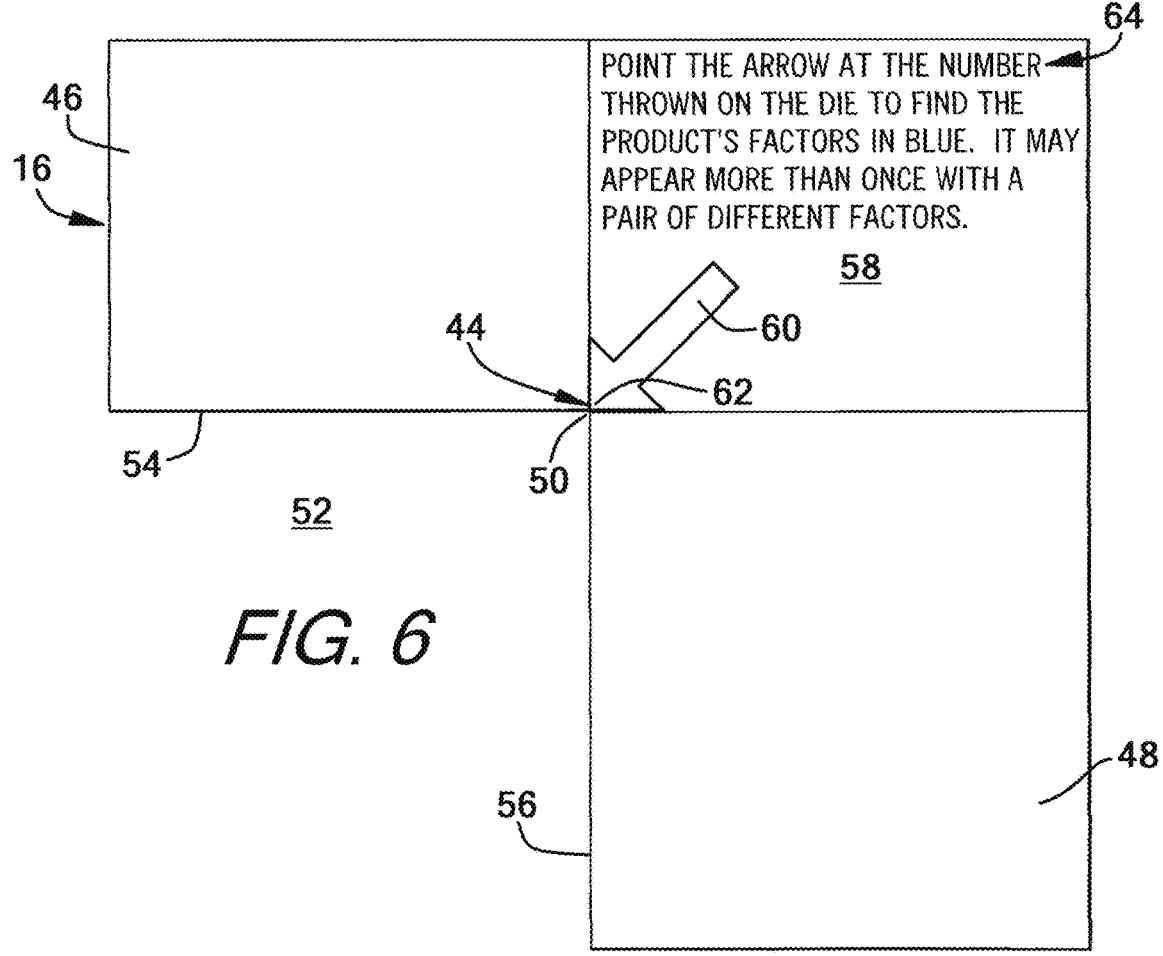
FIG. 3 is a plan view of a second side of a factor card used in an exemplary embodiment of the present invention.

FIGS. 2-5 show a factor card 14 used in the system and method of the present invention. As shown in FIG. 2, the factor card 14 generally has a planar square shape and has a first side 18 and a second side 20 (FIG. 3). The factor card 14 generally has an array or matrix type configuration having a plurality of spaces arranged in a plurality of columns and rows. In an exemplary embodiment, the first side 18 has seven columns and seven rows that define a plurality of spaces 22. As further shown in FIG. 2, the first side 18 of the factor card 14 has a first column of spaces 24 located at left side of the factor card 14. The first side 18 of the factor card 14 further has a first row of spaces 26 located at a lowermost portion of the factor card 14. The first column 24 and the first row 26 intersect to define a shared space 28. The shared space 28 is located at a lowermost left corner of the factor card 14 and has an "X" indicium in the shared space 28. The remaining first column of spaces 24 are numbered with a plurality of first factors 30 consecutively up the first column 24. Thus, certain numbers representing the first factors are positioned up the first column of spaces 24. The remaining first row of spaces 26 are numbered with a plurality of second factors 32 consecutively across the first row 26. Thus, certain numbers representing the second factors are positioned across the first row of spaces 26. As further shown in FIG. 2, the first column of spaces 24 has a first shaded background 34 with the exception of the shared space 28. The first row of spaces 26 has a second shaded background 36 with the exception of the shared space 28. In an exemplary embodiment, the first shaded background 34 is identical to the second shaded background 36, although the backgrounds 34,36 could have different aesthetic configurations if desired. In an exemplary embodiment, the first shaded background 34 and the second shaded background 36 have a blue color. The remaining plurality of spaces 22 are generally positioned in a plurality of further rows and columns. Thus, the remaining plurality of spaces 22 of the factor card 14 are positioned at intersecting lines extending from the numbers of the first column 24 and extending from the numbers of the first row 26, and these spaces have a respective first multiplication product number 38 therein corresponding to the multiplication product of the respective first factors 30 of the first column 26 and the respective second factors 32 of the first row 26.

As further shown in FIG. 2, in an exemplary embodiment, the first side 18 of the factor card 14 utilizes the numbers 1-6 as factors. In particular, the first column of spaces 24 is numbered consecutively from 1 to 6, or 1, 2, 3, 4, 5 and 6 up the column 24. Thus, the first plurality of first factors is the set of numbers 1, 2, 3, 4, 5 and 6 numbered consecutively up the column 24. The first row of spaces 26 is numbered consecutively from 1 to 6, or 1, 2, 3, 4, 5 and 6 across the row 26. Thus, the plurality of second factors is the set of numbers 1, 2, 3, 4, 5 and 6 numbered consecutively across the row 26. The plurality of spaces 22 positioned at intersecting lines extending from the numbers of the first column 24 and the extending from the numbers of the first row 26 have a respective product number 38 therein corresponding to the multiplication product of the respective numbers or first factors 30 of the first column 24 and numbers or second factors 32 of the first row 26. The multiplication product number 38 may be considered a first product number 38. As shown in FIG. 2, the row immediately above the first row 26 and adjacent the first column 24 has the multiplication product numbers 1, 2, 3, 4, 5, and 6, representing the product numbers from the first factor 1 multiplied with the second factors 1-6 respectively. The next row above and adjacent the first column 24 has the multiplication product numbers 2, 4, 6, 8, 10 and 12, representing the product numbers from the first factor 2 multiplied with the second factors 1-6 respectively. The next row above and adjacent the first column 24 has the multiplication product numbers 3, 6, 9, 12, 15, 18, representing the product numbers from the first factor 3 multiplied with the second factors 1-6 respectively. The next row above and adjacent the first column 24 has the multiplication product numbers 4, 8, 12, 16, 20 and 24, representing the product numbers from the first factor 4 multiplied with the second factors 1-6 respectively. The next row above and adjacent the first column 24 has the multiplication product numbers 5, 10, 15, 20, 25, and 30, representing the product numbers from the first factor 5 multiplied with the second factors 1-6 respectively. Finally, the next row above and adjacent the first column 24 has the multiplication product numbers 6, 12, 18, 24, 30 and 36, representing the first factor 6 multiplied with the second factors 1-6 respectively.

The factor card 14 also has a second side 20 having a second matrix or array as shown in FIG. 3. The matric/array on the second side 20 is similarly configured as the first side 18 shown in FIG. 2 and has plurality of spaces 22, the first column of spaces 24, the first row of spaces 26, the shared space 28, the plurality of first factors 30, the plurality of second factors 32, the shaded backgrounds 34,36 and the plurality of multiplication product numbers 38. In this exemplary embodiment, the various factors utilized, however, are partly different from the factors 1-6 utilized on the first side 18 of the factor card 14. Thus, the first factors may also be considered a plurality of third factors 40 and the second factors may also be considered a plurality of fourth factors 42.

As shown in FIG. 3, in an exemplary embodiment, the second side 20 of the factor card 14 utilizes the numbers 4-9 as factors. This can be considered as representing a further advanced level or high level of teaching multiplication to students. In particular, the first column of spaces 24 is numbered consecutively from 4 to 9, or 4, 5, 6, 7, 8 and 9 up the column 24. Thus, the plurality of first factors, or plurality of third factors 40, is the set of numbers 4, 5, 6, 7, 8 and 9 numbered consecutively up the column 24. The first row of spaces 26 is numbered consecutively from 4 to 9, or 4, 5, 6, 7, 8 and 9 across the row 26. Thus, the plurality of second factors 32, or plurality of fourth factors 42, is the set of numbers 4, 5, 6, 7, 8 and 9 numbered consecutively across the row 26. For reference, as FIG. 3 represents a further level from FIG. 2, and a continuation of multiplication learning for the student, the factors will be referred to as the plurality of third factors 40 and the plurality of fourth factors 42. It is understood if a factor card 14 of FIG. 3 was used as a stand-alone factor card 14, the factors could also be referred to interchangeably as the plurality of first factors 30 and the plurality of second factors 32. The plurality of spaces 22 positioned at intersecting lines extending from the numbers of the first column 24 and the extending from the numbers of the first row 26 have a respective product number 38 therein corresponding to the multiplication product of the respective numbers or third factors 40 of the first column 24 and numbers or fourth factors 42 of the first row 26. The product number 38 may be referred to as a second product number 38. As shown in FIG. 3, the row immediately above the first row 26 and adjacent the first column 24 has the multiplication product numbers 16, 20, 24, 28, 32 and 36, representing the product numbers from the third factor 4 multiplied with the fourth factors 4-9 respectively. The next row above and adjacent the first column 24 has the multiplication product numbers 20, 25, 30, 35, 40, 45, representing the product numbers from the third factor 5 multiplied with the fourth factors 4-9. The next row above and adjacent the first column 24 has the multiplication product numbers 24, 30, 36, 42, 48, and 54 representing the product numbers from the third factor 6 multiplied with the fourth factors 4-9 respectively. The next row above and adjacent the first column 24 has the multiplication product numbers 28, 35, 42, 49, 56 and 63, representing the product numbers from the third factor 7 multiplied with the fourth factors 4-9 respectively. The next row above and adjacent the first column 24 has the multiplication product numbers 32, 40, 48, 56, 64 and 72, representing the product numbers from the third factor 8 multiplied with the fourth factors 4-9 respectively. Finally, the next row above and adjacent the first column 24 has the multiplication product numbers 36, 45, 54, 63, 72 and 81, representing the third factor 9 multiplied with the fourth factors 4-9 respectively.

FIG. 4 shows an alternative embodiment of the factor card 14. The factor card 14 of FIG. 4 is constructed similar to the factor card 14 of FIGS. 2 and 3. The factor card has a first column of spaces 24 and a first row of spaces 26 that intersect to define a shared space 28. The first column 24 has a plurality of first factors 30 and the first row 26 had a plurality of second factors 32. In this exemplary embodiment, the first and second factors 30,32 are not the numbers 1 through 6 or 4 through 9. Rather, the plurality of first factors 30 are the numbers 3 through 8 consecutively up the first column 24, and the plurality of second factors 32 are the numbers 2 through 7 consecutively across the first row 26. The plurality of spaces 22 contain the respective multiplication product numbers in the spaces that are positioned at intersecting lines extending from the first column 24 and the first row 26. Such multiplication product numbers are shown in FIG. 4. FIG. 5 shows another alternative embodiment of the factor card 14. Similar to the other factor cards 14, the factor card in FIG. 5 has the first column 24 having the plurality of first factors 30 positioned up the first column 24. The factor card 14 further has the first row 26 having the plurality of second factors 32 positioned across the first row 26. In this particular embodiment, the plurality of first factors 30 are random numbers and not consecutively numbered, namely the factors 4, 8, 7, 2, 3 and 9. The plurality of second factors 32 are random numbers and also not consecutively numbered, namely 1, 9, 4, 6, 5 and 2. The plurality of spaces 22 further include the plurality of multiplication product numbers based on the respective first factors 30 multiplied with the respective second factors 32.

As can be appreciated from the description herein, the factor card 14 has the first side 18 represented by FIG. 2 and the second side 20, opposite the first side 18 represented by FIG. 3. It is understood that the first side 18 and the second side 20 could be contained on separate factor cards 14 if desired. The factor card 14 could further be a different combination of FIGS. 2-5. It is further understood that the factor card 14 can include other configurations of first factors 30 and second factors 32 along with the associated multiplication product numbers 38. Finally, the factor card 14 could be designed with different numbers of columns and rows if desired wherein differently-sized matrix configurations are provided. It will be understood that the factor finder member 16 could be adjusted in sized to accommodate factor cards 14 of different sizes.

FIG. 6 discloses the factor finder member 16. The factor finder member 16 has a location structure 44 used to locate a multiplication product number 38. In particular, the factor finder member 16 has a first member 46 that cooperates with a second member 48 to define the location structure 44 generally at an interface area associated with the first member 46 and the second member 48. Furthermore, the first member 46 intersects with the second member 48 to define the location structure 44 in the form of an inner corner 50. In an exemplary embodiment, the first member 46 and the second member 48 intersect at a right angle. An open area 52 is defined between the first member 46 and the second member 48 and proximate the inner corner 50. The first member 46 further defines a first inner edge 54, and the second member 48 defines a second inner edge 56. The first member 46 and second member 48 are of a predetermined length and in an exemplary embodiment, dimensioned to be able to span across entire columns and rows of the factor card 14 as will be described in greater detail below.

As further shown in FIG. 6, the factor finder member 16 defines a first area 58 opposite the open area 52. In one exemplary embodiment, the factor finder member 16 has an arrow 60 having an apex 62 positioned generally at the inner corner 50 or location structure 44. The arrow 60 is positioned generally at an angle with respect to the first member 46 and the second member 48 and "points" into the open area 52. The location structure 44 in the form of the inner corner 50 with the arrow 60 may also be referred to as a pointer element, direction element or other such designation. The first area 58 may further include instruction(s) 64 for the student in using the factor finder member 16. In an exemplary embodiment, the instruction 64 shown in FIG. 6 recites, "Point The Arrow At The Number Thrown On The Die To Find The Product's Factor In Blue. It May Appear More Than Once With A Pair Of Factors."

Figure 7:
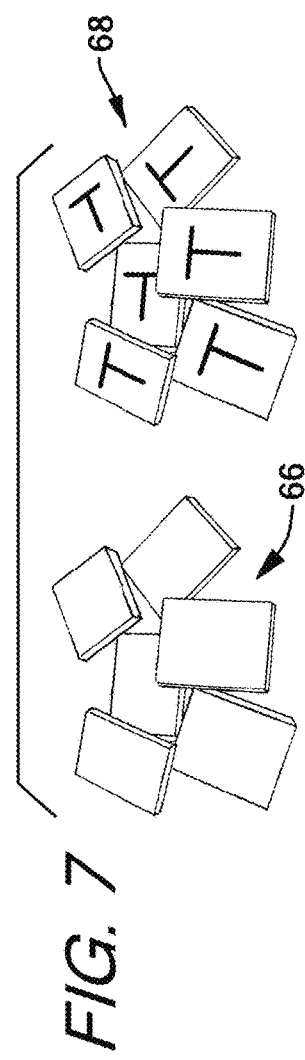
FIG. 7 is a perspective view of a plurality of building members used in additional embodiments of the present invention as well as player identification pieces.

FIG. 7 discloses a plurality of building members 66 or paver stones 66 used in a game utilizing the system and method described herein. The building members 66 may further be considered game pieces 66 to be used with a game board to be described. Some of the building members 66 can also be used as a player identification piece 68. Alternatively, a personal item associated with a student/player may be used as a player identification piece 68 as further described below. The building members 66 are dimensioned to be placed within openings defined on a bridge on a game board as will also be further described below.

The physical training aids cooperate to form the system and method for teaching arithmetic, namely multiplication, to a student. Examples of the method will be described. It is understood than an adult/teacher can work with a student that may be a child or multiple children at once. Again, it is understood that each student/child has a certain level of proficiency in addition and subtraction and recognition of numerals associated with factors and multiplication products from the factors in written or printed form. In the system and method, the dice 10, 12, factor card 14 and factor finder member 16 are placed before the student. By rolling the die 10,12, numbers are displayed that corresponding to a multiplication product number 38 wherein the student can begin determining factors 30,32 associated with the product number 38 to learn multiplication facts.

Figure 8:
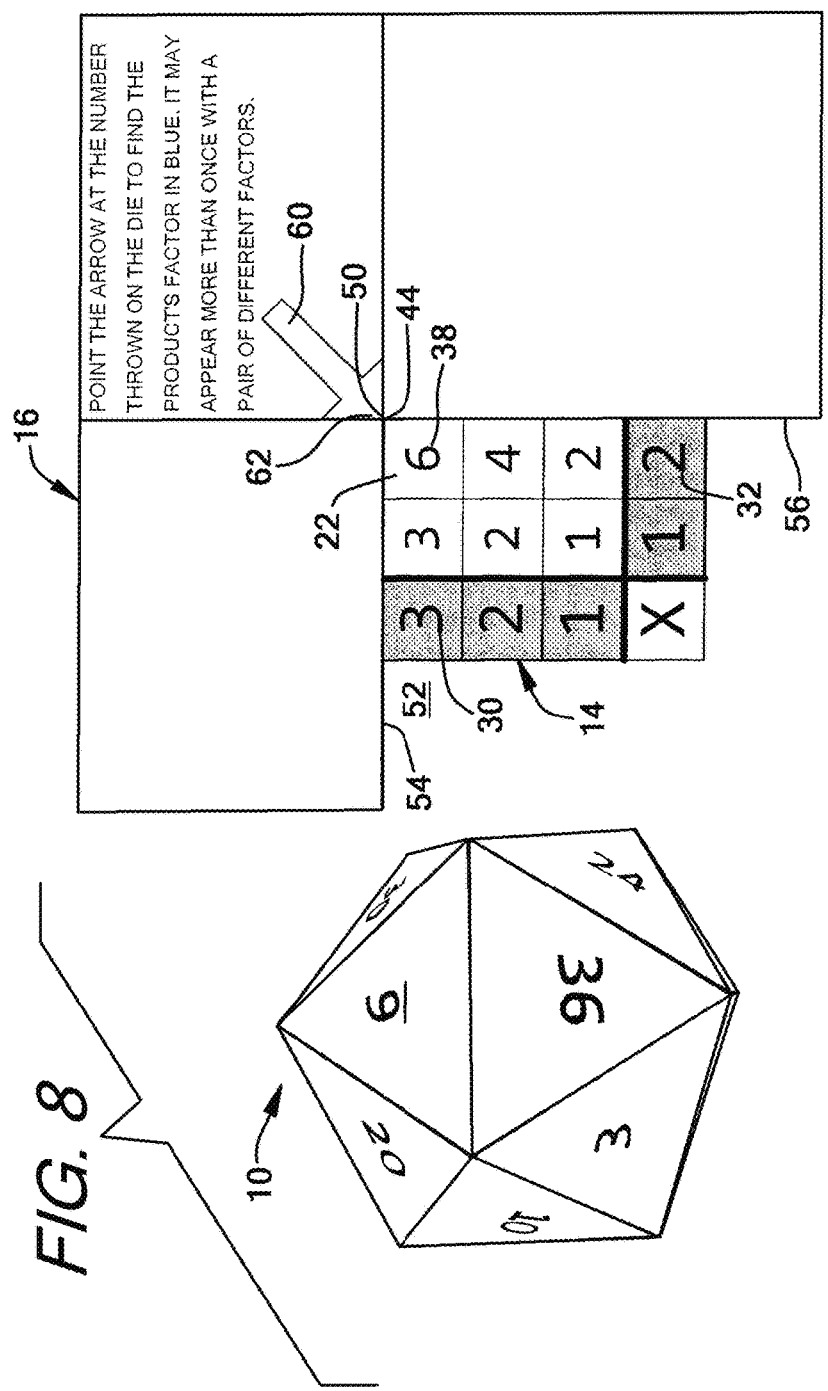
FIG. 8 is a schematic view of a die in combination with the first side of the factor card and the factor finder member.

Referring to FIGS. 2-10, examples of the system and method utilized by a student(s) in learning multiplication are described. It is understood that the die having certain product numbers is used with the factor card having the associated factors for the product numbers. In this example, it is understood that the first die 10 shown in FIG. 1 and the first side of the factor card shown in FIG. 2 are used by the student(s). The student rolls or tosses the first die 10. As an example, the die shows the numeral "6" such as shown in FIG. 8. The student grasps the factor finder member 16 and looks for a product number 6 on the first side 18 of the factor card 14. Upon locating the product number 6, the student places the location structure 44 of the factor finder member 16 at the space 22 occupied by the product number 6. In particular, the inner corner 50 is placed at the upper right corner of the space 22 occupied by the product number 6 wherein the apex 62 of the arrow 60 points directly at the product number 6 which is located in the open area 52. The first inner edge 54 of the first member 46 extends across the row of spaces 22 in line with the space 22 occupied by the product number 6. The second inner edge 56 of the second member 48 extends down the column in line with the space 22 occupied by the product number 6. With eyes directed to the first inner edge 54, the student follows along the first inner edge 54 to the first column of spaces 24 and identifies the first factor 30 that corresponds to the number on the first column 24 adjacent the first inner edge 54. In particular, the student identifies the number "3" as the first factor 30. Similarly, with eyes directed to the second inner edge 56, the student follows along the second inner edge 56 to the first row of spaces 26 and identifies the second factor 32 that corresponds to the number on the first row 26 adjacent the second inner edge 56. In particular, the student identifies the number "2" as the second factor 32. In this fashion, the student learns that the factors 30,32 associated with the product number "6" are "3" and "2." The student begins to learn that 3 times 2 equals 6 or that 2 times 3 equals 6. As further shown in FIG. 8, depending on the location of the product number 38 rolled on the die 10, portions of the factor card 14 can be covered by factor finder member 16 and the first member 46 and second member 48 may extend beyond the first column 24 and first row 26 respectively.

It is further understood from FIGS. 2 and 8 that the student could also position the factor finder member 16 at other locations on the factor card 14. The number "6" appears at other locations on the first side 18 of the factor card 14. Thus, the student could also place the factor finder member 16 at the product number "6" wherein the factor finder member 16 assists the student in identifying the factors 6 and 1, on either of the first column 24 and the first row 26. The student could also position the factor finder member 16 at the product number "6" to identify the first factor "2" on the first column 24 and the second factor "3" on the first row 26.

FIG. 9 discloses another example. The student rolls or tosses the first die 10. As an example, the die shows the numeral "36" such as shown in FIG. 9. The student grasps the factor finder member 16 and looks for a product number 36 on the first side 18 of the factor card 14. Upon locating the product number 36, the student places the location structure 44 of the factor finder member 16 at the space 22 occupied by the product number 36. In particular, the inner corner 50 is placed at the upper right corner of the space 22 occupied by the product number 36 wherein the apex 62 of the arrow 60 points directly at the product number 36 which is located in the open area 52. It is noted that in this example, the factor finder member 16 is positioned at outer edges of the factor card 14 wherein there is no overlap. The first inner edge 54 of the first member 46 extends across the row of spaces 22 in line with the space 22 occupied by the product number 36. The second inner edge 56 of the second member 48 extends down the column in line with the space 22 occupied by the product number 36. With eyes directed to the first inner edge 54, the student follows along the first inner edge 54 to the first column of spaces 24 and identifies the first factor 30 that corresponds to the number on the first column 24 adjacent the first inner edge 54. In particular, the student identifies the number "6" as the first factor 30. Similarly, with eyes directed to the second inner edge 56, the student follows along the second inner edge 56 to the first row of spaces 26 and identifies the second factor 32 that corresponds to the number on the first row 26 adjacent the second inner edge 56. In particular, the student identifies the number "6" as the second factor 32. In this fashion, the student learns that the factors 30,32 associated with the product number "36" are "6" and "6." The student begins to learn that 6 times 6 equals 36. It is understood that in this configuration, the first inner edge 54 or the second inner edge 56 may not extend completely to the first column 24 or the first row 26, but the student can continue moving eyes to identify factors 30,32 accordingly.

Figure 10:
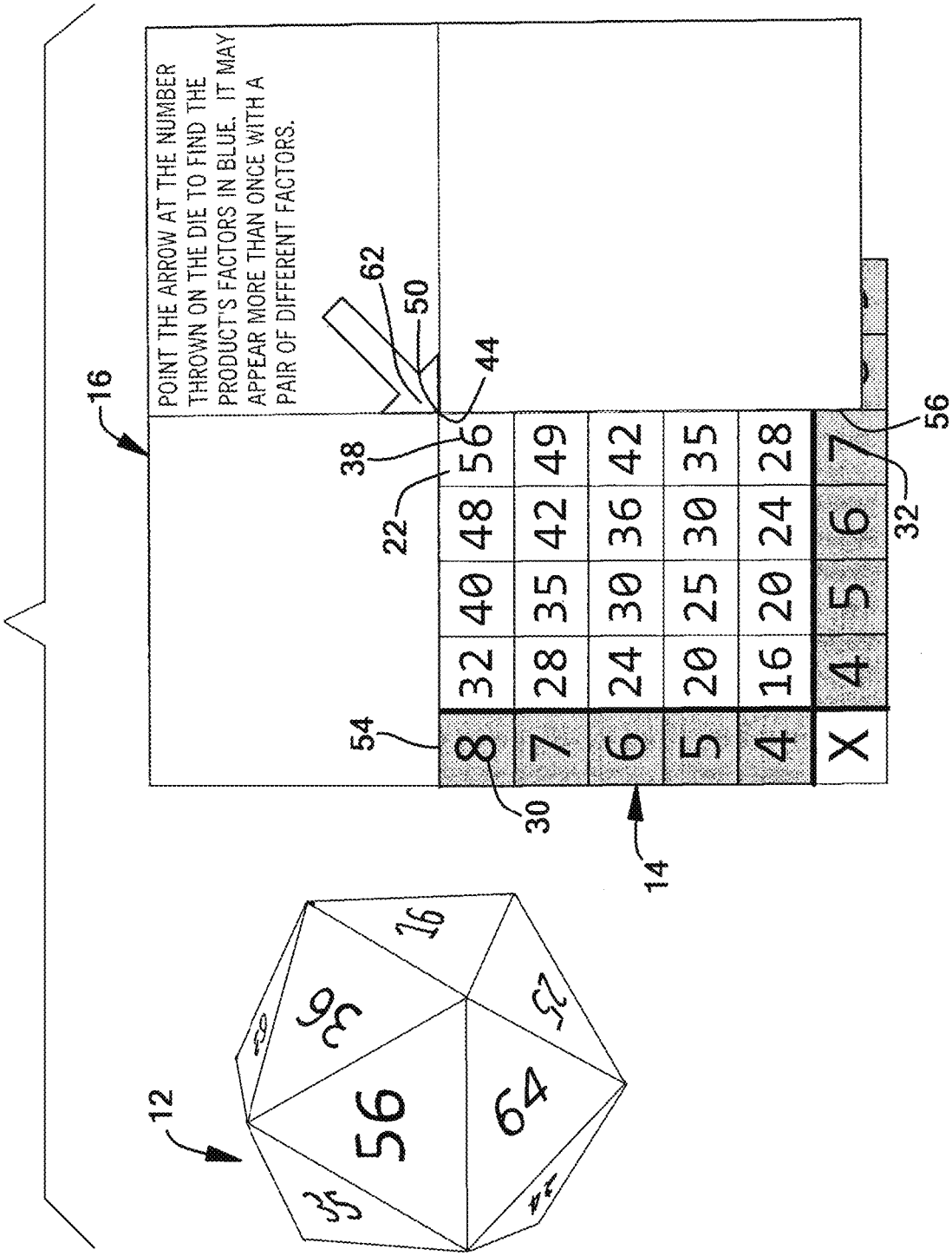
FIG. 10 is a schematic view of a die in combination with the second side of the factor card and the factor finder member.

FIG. 10 shows yet another example. As discussed, it is understood that the die having certain product numbers is used with the factor card having the associated factors for the product numbers. In this example, it is understood that the second die 12 shown in FIG. 1 and the second side 18 of the factor card 14 shown in FIG. 3 are used by the student(s). The student rolls or tosses the second die 12 to show a second numerical value. As an example, the die shows the numeral "56" such as shown in FIG. 10. The student grasps the factor finder member 16 and looks for a product number 56 on the second side 18 of the factor card 14. Upon locating the product number 56, the student places the location structure 44 of the factor finder member 16 at the space 22 occupied by the product number 56. In particular, the inner corner 50 is placed at the upper right corner of the space 22 occupied by the product number 56 wherein the apex 62 of the arrow 60 points directly at the product number 56 which is located in the open area 52. The first inner edge 54 of the first member 46 extends across the row of spaces 22 in line with the space 22 occupied by the product number 56. The second inner edge 56 of the second member 48 extends down the column in line with the space 22 occupied by the product number 56. With eyes directed to the first inner edge 54, the student follows along the first inner edge 54 to the first column of spaces 24 and identifies the first factor 30 that corresponds to the number on the first column 24 adjacent the first inner edge 54. In particular, the student identifies the number "8" as the first factor 30. Similarly, with eyes directed to the second inner edge 56, the student follows along the second inner edge 56 to the first row of spaces 26 and identifies the second factor 32 that corresponds to the number on the first row 26 adjacent the second inner edge 56. In particular, the student identifies the number "7" as the second factor 32. In this fashion, the student learns that the factors 30,32 associated with the product number "56" are "8" and "7." The student begins to learn that 8 times 7 equals 56 or that 7 times 8 equals 6. As further shown in FIG. 10, depending on the location of the product number 38 rolled on the die 12, portions of the factor card 14 can be covered by the factor finder member 16 and the first member 46 and second member 48 may extend beyond the first column 24 and first row 26 respectively.

It is understood that these steps can be repeated with the student/child numerous times wherein the student can continuously identify factor numbers associated with the product number. In this fashion, the student readily learns multiplication facts. With sufficient repetition, the student/child will naturally memorize these arithmetic facts associated with multiplication. Typically, after addition and subtraction, multiplication concepts are focused on with students. It is understood that division concepts can be learned using similar steps with the physical aids/manipulatives described in the present application.

This method and system using the physical aids/manipulatives can further be incorporated into games played by the child/student with an adult and/or with other children.

FIGS. 11-13 disclose game boards associated with a game that students can play using the system and method for teaching arithmetic of the present invention. It is understood that different game boards may be used in the game wherein the different game boards represent varying levels of complexity. FIG. 11 discloses a first game board for a first level of play, and FIG. 13 discloses a second game board for a second level of play that is considered a more advanced or higher level of play. This game is entitled "The City of Seven Bridges" and accommodates 2-4 students/players that may be referred to as travelers T. The travelers seek to be the first to cross all seven bridges and be declared the winner of the game.

The present invention further discloses an apparatus for playing a board game relating to mathematics and, in particular, multiplication. FIG. 11 discloses the first game board, designated with the reference numeral 80. The game board 80 has a river 82 extending through the game board wherein four land masses 84 are defined on the game board. The land masses are further designated A, B, C and D. The river 82 has multiple branches and wherein the land mass D defines an island land mass.

Seven bridges 86 are positioned over the river 82 and extend between different land masses. The seven bridges 86 are further designated B1, B2, B3, B4, B5, B6 and B7. Each bridge 86 has a two-lane thoroughfare having a first lane 88 having a first direction and a second lane 90 having a second direction generally opposite the first direction. As further shown in FIG. 11, the direction of the lanes is designated by appropriate arrows A. Initially, each bridge 86 is considered to be partially constructed. Each lane 88,90 on the bridges 86 has a plurality of building member openings 92 or paver block openings 92. Thus, the openings 92 may also be considered a plurality of spaces 92 on the game board 80. As explained in greater detail below, the travelers T obtain paver stones 66 through gameplay to insert into the openings 92 to then have the ability to cross the bridges 86. Each lane 88,90 has a number in each opening 92 corresponding to a multiplication factor. In an exemplary embodiment, there are five openings 92 in each lane 88,90 of the bridges 86, although this number an vary. Each opening 92 in a lane 88,90 has the identical number across the lane 88,90. With the first game board 80, the numbers designated on the bridges 86 are the factors 1 through 6. It is understood that the numbers designated in the lanes of the bridges 86 can vary. It is further understood that the game board 80 could further have three-dimensional characteristics. For example, the bridges 86 could extend above a plane defined by the areas of the river 82 and the land masses 84. The land masses 84 could also have a three-dimensional configuration and undulating surfaces.

Figure 14:
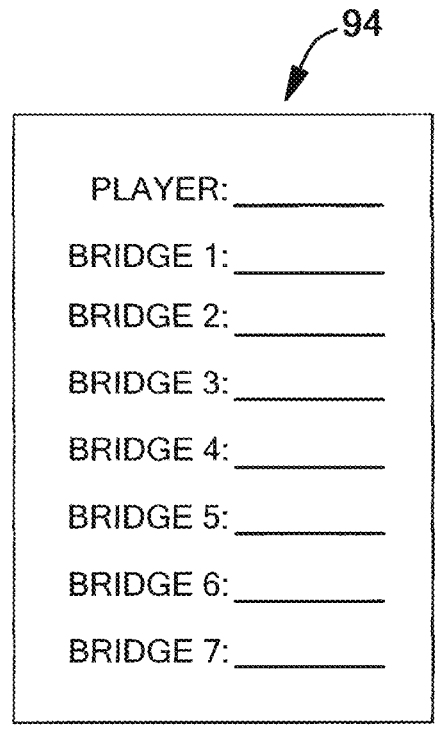
FIG. 14 is a schematic view of a player record sheet for use with the game of the present invention.

The travelers T will use the die 10,12, the factor card 14, the factor finder member 16 and a plurality of paver stones 66. In the first level of play with the first game board 80, the first die 10 is used along with the first side of the factor card 14 that utilizes the factors 1 through 6. Each traveler T can use a player identification piece 68 to designate which land mass 84 the traveler T will begin play from and place the player identification piece 68 on that corresponding land mass 84. Land mass D is only used if there are four players/travelers. A record sheet 94 such as disclosed in FIG. 14 can be used by each traveler T to keep track of the bridges 86 crossed by the travelers T. The record sheet 94 may be entitled, "Record of Bridges Crossed." Additional rules of the game include limiting where travelers can place paving stones 66. A traveler beginning on land mass A can only place paving stones on bridges B1, B2 and B7. A traveler beginning on land mass B can only place paving stones on bridges B1, B3 and B4. A traveler beginning on land mass C can only place paving stones on bridges B5, B6 and B7. A traveler beginning on land mass D can only place paving stones on bridges B2, B3, B4, B5 and B6. Accordingly, at the start of the game, travelers T can only place paving stones 66 on the bridges on their land mass 84. The youngest student/player always rolls first. This is applicable for picking a traveler, choosing a land mass 84 or rolling the die 10,12. Play then continues clockwise around the game board 80.

As discussed, the object of the game is to be the first to cross all seven bridges 86. The openings 92 on the bridges 86 must be filled in with paving stones 66 before the traveler T can cross the bridge 86. In order to place paving stones 66 on the bridges 86 or move to a different land mass 84, the traveler T rolls the die, identifies factors, and places paving stones 66 on the openings 92 containing those factors. If the bridge 86 is already completely paved across to another land mass for a given factor, the traveler may move to that land mass 84.

To begin play, a first traveler T1, for example, rolls the first die 10 wherein the number 18 turns up. The traveler T1 uses the factor finder member 16 on the first side 18 of the factor card 14. Consistent with the description above, the traveler T1 identifies the factors 3 and 6 from the product number 18. The traveler T1 can place a paving stone 66 on a bridge 86 containing a number 3 and another paving stone containing a number 6. This sequence of steps continues with the other travelers T as each traveler takes turns rolling the die 10. Thus, a second traveler T2 rolls the die 10 wherein the number 12 turns up. The traveler T2 uses the factor finder member 16 on the first side 18 of the factor card 14 to identify the factors 3 and 4. The second traveler T2 further identifies the factors 6 and 2 that are factors of the product number 12. The second traveler T2 can place up to four paving stones 66 on the openings containing a 3, 4, 2 and 6 on the bridges 86.

This gameplay continues between or among the travelers T clockwise around the game board 80. It is understood that as the travelers T continue to roll the die 10, different possibilities arise with each traveler turn. One possibility is the traveler T places paving stones 66 on one or more of the respective bridges 86, and another possibility is the traveler T moves across a bridge 86 to another land mass 84. Finally, depending on the particular lanes 88,90 of the bridges 86 that are paved and the location of the traveler T on a particular land mass 84, nothing happens at all, and the game continues to the next traveler to roll the die 10. Thus, play continues in this fashion until the openings 92 on the bridges 86 are filled by paving stones 66 wherein lanes 88,90 of the bridge 86 are completely paved. Upon a roll of the die 10, if an identified factor indicates openings 92 on a lane 88,90 of a bridge 86 are completely paved, and the associated arrow indicates movement to another land mass 84 from the current location of the traveler T, then the traveler T may move to the other land mass 84. If a factor indicates that the openings 92 on a lane 88,90 on a particular bridge 86 are completely paved and the associated arrow indicate movement from another land mass 84 (e.g., the arrow points to the land mass 84 currently occupied by the traveler T), then the factor/paving stone 66 cannot be used for that bridge 86. If a factor indicates openings 92 on the bridges 86 are not paved, then a paving stone 66 must be placed in that opening 92. Play continues in this fashion until a traveler T has visited all of the land masses 84 and crossed all of the bridges 86.

Referring to FIGS. 11 and 12, a further example of play is described. The traveler T1 is positioned on land mass A. Bridge B1 has all of the openings 92 in the lane containing the number 5 paved with paving stones 66 and two of openings 92 in the lane containing the number 2 paved with paving stones 66. Bridge B2 has all of the openings 92 in the lane containing the number 1 paved and three of the openings 92 in the lane containing the number 6 paved. Bridge B7 has all of the openings 92 in the lane containing the number 4 paved and four of the openings 92 in the lane containing 3 paved. The traveler T1 rolls the die 10 and the die 10 shows a numeral "4." The traveler T1 identifies the factors of the product number "4" as 2 times 2 or 1 times 4. The traveler T1 can place two paving stones 66 on the lane of bridge B1 on the openings 92 containing the number 2. On the bridge B2 and bridge B7, the openings 92 on the lanes containing the numbers 1 and 4 are completely filled and thus paved, so the factors 1 and 4 cannot be used for placing paving stones 66 in those particular openings 92. However, the factor 1 allows for the traveler T1 to cross bridge B2 to arrive on land mass D. Although the lane containing openings with the number 4 on bridge B7 are completely paved, the associated arrow A points from land mass C to land mass A. Accordingly, the factor 4 cannot be used to cross bridge B7, and the factor 4 is unusable.

As discussed, this fashion of play continues among the travelers T. Each time a traveler T crosses a bridge 86, the traveler T records such crossing on the record sheet 94. The play continues with the travelers T rolling the die 10 until a traveler T becomes the first traveler to cross each one of the plurality of bridges 86. The first traveler T to cross all of the bridges is declared the winner of the City of Seven Bridges game. A new game can then be commenced where the children/students/travelers continue to learn multiplication facts using the system and method as describe above.

FIG. 13 discloses a game board 96 that represents a second level of play or considered a higher or more advanced level of play. This second game board 96 has similar elements as described above regarding the river 82, land masses 84 and bridges 86. Like structures are referenced with identical reference numerals. In this level of play, a higher level of factors is used. Thus, the openings 92 of the various lanes 88,90 of the bridges 86 are numbered with the factor numbers 4 through 9. In this level of play, the second die 12 is used along with the second side 20 of the factor card 14 that uses the numbers 4 through 9. The factor finder card 16 can also be used. With these physical aids/manipulatives, students/travelers use the same gameplay steps in rolling the die 12, identifying the factors, placing paving stones 66 on the various lanes 88,90 of the bridges 86 and travelling to the different land masses 84. As with the first level of play, the first traveler T to cross all of the bridges 86 is declared the winner.

The first game board 80 and second game board 96 are disclosed and associated respectively with the first and second dies 10,12 and the first side 18 and second side 20 of the factor card 14. As alternative embodiment of factor cards 14 can be utilized such as shown in FIGS. 4 and 5, it is understood that other embodiments of game boards with additional rules for use of paver stones 66 etc. can be used to form games of additional levels of play or other arithmetic games wherein the play of the game allows players to learn multiplication facts. It is understood that the game board have generally rectangular configuration in one embodiment, but could have other shapes as desired.

It is understood that the various manipulatives and game boards described herein can include various colors, other decorative elements or other geometric shapes. As discussed, the game boards could further include three-dimensional structures or characteristics. The plurality of spaces and game pieces can vary in size. The plurality of spaces on the game board can also vary as desired, as well as the number of bridges and land masses on the game board. Thus, many variations of the game boards are possible without affecting the inventive concepts of the present invention.

As discussed above, the system and method provides manipulatives wherein a first piece of information (or datum, data or fact(s)) is provided or otherwise displayed wherein the first information is then used to determine a second piece of information or additional information or further categories of information (or second datum, data or fact(s)). The second information or additional information will have a relation to or be associated with the first information. In the multiplication example described above, the dice are used to display a first piece of information, e.g., a product number. The product card manipulative is then used to determine a second information, e.g. multiplication factors associated with the product number. The second information can be used to earn a game piece to be placed on a game board when playing a board game. In the multiplication game example, the second information in the form of factors are used to earn game pieces in the form of building members 66 to be placed on the game boards 80,96. Similar systems and methods can be used in other areas. Such areas include other STEM (Science, Technology, Engineering and Mathematics) areas.

In a further example, the system and method can be modified for a science application. The die can be designed to have indicia to be displayed wherein the indicium are individual elements known on the Periodic Table of Elements. Thus, an individual element may represent the first piece of information. Once the first piece of information in the form of an element is displayed, additional manipulative members can be structured for the student/player to determine a second piece of information or additional information associated with or related to the element. Such additional information can be the number of protons, neutrons or electrons associated with the element. The second information could further be other data, facts or properties associated with the element. The second information determined can then also be associated with a game piece to be placed onto an associated game board in the play of a board game.

Thus, it is understood that the system and method can have a manipulative used to display first information. A further manipulative or manipulatives can be used to identify or determine second information, which is associated with the first information. The second information determined can be used by a student/player to earn a game piece to be placed on a game board in the play of a board game.

The system and method of teaching arithmetic provides several benefits. As discussed, the present method and system allows children to learn arithmetic more easily and efficiently. The use of physical aids, or manipulatives, that are used during a game further promotes quick and efficient learning of arithmetic. Through the use of the manipulatives, students use various senses to touch and use the aids that help make visual representation of mathematical concepts. As can be appreciated from the above discussion, the system and method provide for a child/student to identify factors associated with a product numeral provided by a roll of a die. Through multiple uses of the system and method, the child learns the relevant mathematical facts which can be further enhanced by continuously and repeatedly playing the games. By continually identifying factors associated with a multiplication product, the child also becomes more confident and empowered in knowing multiplication. The child is confident in using the factors card and factors finder member. Thus, the child naturally progresses to knowing the arithmetic facts. The introduction of games also provides benefits. Because the child is playing games rather than doing tedious problems from a typical prior art worksheet, the attention span of the child is maintained throughout the process. Even when not playing the game but using the system and method steps, an adult can make the process and environment fun and exciting for the child with the use of the factor finder member and rolls of die. This promotes thinking by the children rather than straight memorization. This learning experience is enjoyable and challenging to the child. Many studies have shown that incorporating playful aspects into a child curriculum promotes a natural enthusiasm for children in learning arithmetic. In sum, the child learns arithmetic more easily and efficiently resulting in the child having more pride in the achievement of learning. It has been found that prior art methods of teaching arithmetic can take from kindergarten through the second grade. The system and method of the present invention allows children to learn arithmetic significantly more quickly. Furthermore, it has been found that children as young as the third grade through the eighth grade have excelled in using the present system and method to learn multiplication facts. Similar concepts help the students learn division facts. Even other age groups that need assistance in arithmetic can benefit from the present system and method.

While the invention has been described in its preferred embodiments, it is to be understood that the words which have been used are words of description rather than limitation and that changes may be made within the purview of the appended claims without departing from the true scope and spirit of the invention in its broader aspects.

What is claimed is:

1. A method for teaching arithmetic to a student, the method comprising:

providing a first 20-sided die, respective sides of the die numbered with a number, each number corresponding to a multiplication product from two factors, one factor being selected from a plurality of first factors and the other factor being selected from a plurality of second factors;

providing a factor card having a first side having a plurality of spaces, the first side of the factor card having a first column of spaces numbered with the plurality of first factors, the first side of the factor card having a first row of spaces numbered with the plurality of second factors, wherein spaces positioned at intersecting lines extending from the numbers of the first column and extending from the numbers of the first row have a product number therein corresponding to the multiplication product of the respective numbers of the first column and the first row;

providing a factor finder member having a first member cooperating with a second member to define a corner, the first member defining a first inner edge and the second member defining a second inner edge;

rolling the first die to show a first numerical value;

placing the corner of the factor finder member at the product number on the factor card corresponding to the first numerical value;

identifying a first factor corresponding to the number on the first column adjacent the first inner edge; and identifying a second factor corresponding to the number on the first row adjacent the second inner edge.

2. The method of claim 1 wherein the plurality of first factors are the numbers 1, 2, 3, 4, 5 and 6 and the plurality of second factors are the numbers 1, 2, 3, 4, 5 and 6.

3. The method of claim 2 wherein the first column of spaces on the first side of the factor card are numbered consecutively with the numbers 1, 2, 3, 4, 5 and 6, and the first row of spaces on the first side of the factor card are numbered consecutively with the numbers 1, 2, 3, 4, 5 and 6.

4. The method of claim 3 further providing a second 20-sided die, respective sides of the die numbered with a number, each number corresponding to a multiplication product from two factors, one factor being selected from a plurality of third factors and the other factor being selected from a plurality of fourth factors.

5. The method of claim 4 wherein the factor card has a second side having a plurality of spaces, the second side of the factor card having a first column of spaces numbered with the plurality of third factors, the second side of the factor card having a first row of spaces numbered with the plurality of fourth factors, wherein spaces positioned at intersecting lines extending from the numbers of the first column on the second side of the factor card and extending from the numbers of the first row on the second side of the factor card have a second product number therein corresponding to the multiplication product of the respective numbers of the first column on the second side of the factor card and the first row on the second side of the factor card.

6. The method of claim 5 wherein the plurality of third factors are the numbers 4, 5, 6, 7, 8 and 9 and the plurality of fourth factors are the numbers 4, 5, 6, 7, 8 and 9.

7. The method of claim 6 wherein the first column of spaces on the second side of the factor card are numbered consecutively with the numbers 4, 5, 6, 7, 8 and 9, and the first row of spaces on the second side of the factor card are numbered consecutively with the numbers 4, 5, 6, 7, 8 and 9.

8. The method of claim 7 further comprising the steps of:

rolling the second die to show a second numerical value;

placing the corner of the factor finder member at a second product number on the second side of the factor card corresponding to the second numerical value, the first inner edge extends to the first column and the second inner edge extends to the first row;

identifying a third factor corresponding to the number on the first column on the second side of the factor card adjacent the first inner edge; and identifying a fourth factor corresponding to the number on the first row on the second side of the factor card adjacent the second inner edge.

9. The method of claim 5 wherein the first column and the first row on the first side of the factor card have a shaded background, and wherein the first column and the first row on the second side of the factor card have a shaded background.

10. The method of claim 1 wherein the first member and the second member of the factor finder member intersect at a right angle wherein the corner is defined as an inner corner, and wherein the factor finder member has an arrow having an apex positioned at the inner corner.

11. A system for teaching arithmetic to a student, the system comprising:

a first 20-sided die, respective sides of the die numbered with a number, each number corresponding to a multiplication product from two factors, one factor being selected from a plurality of first factors and the other factor being selected from a plurality of second factors;

a factor card having a first side having a plurality of spaces, the first side of the factor card having a first column of spaces numbered with the plurality of first factors, the first side of the factor card having a first row of spaces numbered with the plurality of second factors, wherein spaces positioned at intersecting lines extending from the numbers of the first column and extending from the numbers of the first row have a product number therein corresponding to the multiplication product of the respective numbers of the first column and the first row;

a factor finder member having a first member cooperating with a second member to define a corner, the first member defining a first inner edge and the second member defining a second inner edge, wherein the corner of the factor finder member is capable of being placed at a product number on the factor card corresponding to a number of the die, and wherein the first inner edge extends to the first column and the second inner edge extends to the first row, wherein a first factor is capable of being identified that corresponds to the number on the first column adjacent the first inner edge, and wherein a second factor is capable of being identified that corresponds to the number on the first row adjacent the second inner edge.

12. The system of claim 11 wherein the plurality of first factors are the numbers 1, 2, 3, 4, 5 and 6 and the plurality of second factors are the numbers 1, 2, 3, 4, 5 and 6.

13. The system of claim 12 wherein the first column of spaces on the first side of the factor card are numbered consecutively with the numbers 1, 2, 3, 4, 5 and 6, and the first row of spaces on the first side of the factor card are numbered consecutively with the numbers 1, 2, 3, 4, 5 and 6.

14. The system of claim 13 further comprising a second 20-sided die, respective sides of the die numbered with a number, each number corresponding to a multiplication product from two factors, one factor being selected from a plurality of third factors and the other factor being selected from a plurality of fourth factors.

15. The system of claim 14 wherein the factor card has a second side having a plurality of spaces, the second side of the factor card having a first column of spaces numbered with the plurality of third factors, the second side of the factor card having a first row of spaces numbered with the plurality of fourth factors, wherein spaces positioned at intersecting lines extending from the numbers of the first column on the second side of the factor card and extending from the numbers of the first row on the second side of the factor card have a second product number therein corresponding to the multiplication product of the respective numbers of the first column on the second side of the factor card and the first row on the second side of the factor card.

16. The system of claim 11 wherein the plurality of third factors are the numbers 4, 5, 6, 7, 8 and 9 and the plurality of fourth factors are the numbers 4, 5, 6, 7, 8 and 9.

17. The system of claim 15 wherein the first column of spaces on the second side of the factor card are numbered consecutively with the numbers 4, 5, 6, 7, 8 and 9, and the first row of spaces on the second side of the factor card are numbered consecutively with the numbers 4, 5, 6, 7, 8 and 9.

18. The system of claim 17 wherein the corner of the factor finder member is capable of being placed at a second product number on the second side of the factor card corresponding to a second number on the second die, the first inner edge extends to the first column and the second inner edge extends to the first row, wherein a third factor is capable of being identified corresponding to the number on the first column on the second side of the factor card adjacent the first inner edge, and wherein a fourth factor is capable of being identified corresponding to the number on the first row on the second side of the factor card adjacent the second inner edge.

19. The system of claim 15 wherein the first column and the first row on the first side of the factor card have a shaded background, and wherein the first column and the first row on the second side of the factor card have a shaded background.

20. The system of claim 15 wherein the plurality of first factors are the numbers 1, 2, 3, 4, 5 and 6, and the plurality of second factors are the numbers 1, 2, 3, 4, 5 and 6.

21. The system of claim 19 wherein the plurality of third factors are the numbers 4, 5, 6, 7, 8 and 9, and the plurality of fourth factors are the numbers 4, 5, 6, 7, 8 and 9.

22. The system of claim 11 wherein the first member and the second member of the factor finder member intersect at a right angle wherein the corner is an inner corner.

23. The system of claim 22 wherein the factor finder member has an arrow having an apex positioned at the inner corner.

24. The system of claim 22 wherein the factor finder member defines a first area adjacent the inner corner, the first area having instruction for the student for properly placing the factor finder member with the factor card.

25. The system of claim 11 further comprising a game board and game pieces, the game board having a plurality of spaces having a respective factor number in each space, wherein in response to identifying a first factor and a second factor, a game piece is capable of being placed on the game board in a space having a factor number corresponding to the first factor and the second factor.

\* \* \* \* \*